UNITED STATES PATENT OFFICE.

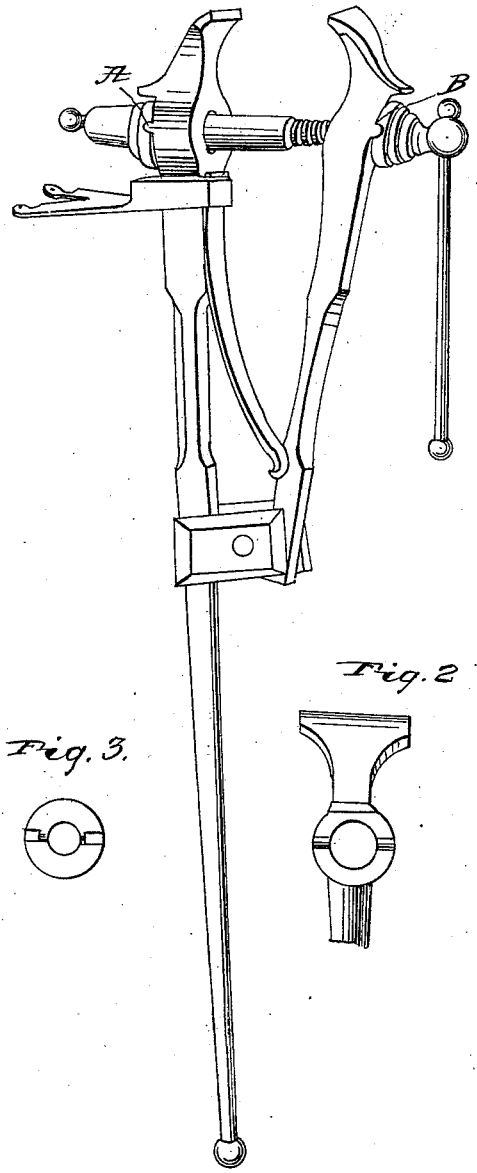

JOHN WETHERELL, OF ALLEGHENY, PENNSYLVANIA.

VISE.

Specification of Letters Patent No. 1,132, dated April 22, 1839.

*To all whom it may concern:*

Be it known that I, JOHN WETHERELL, of the borough of Allegheny, Allegheny county, Pennsylvania, have invented a new and useful Improvement in Vises; and I do hereby declare that the following is a full and exact description of my said improvement.

The object of my said improvement is to prevent the great friction and consequent wear attendant on the present construction of vises, arising from the unequal bearing of the screw box upon the hindmost or fixed cheek or jaw, and of the collar of the screw pin upon the movable cheek or jaw of the vise, which bearings are continually changing according as the vise is more or less opened or closed. To prevent this inequality of bearing, I fix two pins or projections, one on each side of the eye or opening in the fixed cheek or jaw of the vise. These pins or projections I make of iron, steel, or other suitable material, and I attach them to the cheek or jaw by welding or other means. They are of a cylindrical form, or a form approaching thereto, and are placed so that their axes are in a horizontal direction.

The face of the collar upon the screw box, which commonly bear against the cheek, I make with two hollows, corresponding in form to the said pins or projections, upon which pins or projections the said hollows are fitted so as to form a joint admitting of free motion upward and downward as upon a center. I also attach two similar pins or projections, to the movable cheek or jaw of the vise, one on each side of the eye or opening through which the screw pin passes, which pins or projections are received into corresponding hollows on the face of the collar or washer which commonly bears against the cheek or jaw, thereby forming a joint admitting of motion similar to that at the back of the vise.

My said improvement may be varied by attaching the pins or projections to the collars of the screw box and screw pin, and making the hollows corresponding thereto upon the cheeks or jaws of the vise.

In the drawing accompanying this specification Figure 1, represents the vise complete, A, B, being the pins or projections. Fig. 2, is a front view of the cheek or jaw, showing the pins or projections. Fig. 3, a front view of the collar or washer, showing the hollows corresponding to the pins or projections.

What I claim as my invention, and desire to secure by Letters Patent is—

The application of the pins or projections to the cheeks or jaws of the vise fitting into corresponding hollows on the face of the collar of the screw box, and the collar or washer of the screw pin; or of pins or projections upon the collars fitting into hollows in the cheeks or jaws, in such a manner as to form a joint admitting of free motion, for the purpose of preventing the friction and consequent wear attendant on the common construction of vises.

JOHN WETHERELL.

Witnesses:
   M. B. LOURIE,
   ROBERT HAQUE.